United States Patent [19] [11] 3,731,951
Gruenberger [45] May 8, 1973

[54] ADJUSTABLE LINK THREAD CLEANER

[75] Inventor: Lawrence M. Gruenberger, West Allis, Wis.

[73] Assignee: Allis-Chalmers Manufacturing Company, Milwaukee, Wis.

[22] Filed: Dec. 16, 1970

[21] Appl. No.: 98,560

[52] U.S. Cl. ................... 280/461 A, 85/47, 172/439, 287/60
[51] Int. Cl. ............................................. B60d 1/14
[58] Field of Search .................... 280/461 A; 287/60; 85/47, 32 V; 172/439, 448

[56] References Cited

UNITED STATES PATENTS

| 226,450 | 4/1880 | Ibbotson et al. | 85/32 V UX |
| 2,696,397 | 12/1954 | Booth | 287/60 |
| 2,795,221 | 6/1957 | Braendel | 85/47 X |
| 3,053,552 | 9/1962 | Horney | 280/461 A |
| 3,371,945 | 3/1968 | Adams et al. | 280/461 A |

FOREIGN PATENTS OR APPLICATIONS 570,889 7/1945 Great Britain ........................ 85/47

Primary Examiner—Leo Friaglia
Attorney—Arthur L. Nelson, Kenneth C. McKivett and Robert B. Benson

[57] ABSTRACT

An adjustable link having an internally threaded sleeve receiving an externally threaded extension member with automatic thread cleaning means to provide a freely running thread.

10 Claims, 7 Drawing Figures

PATENTED MAY 8 1973 3,731,951
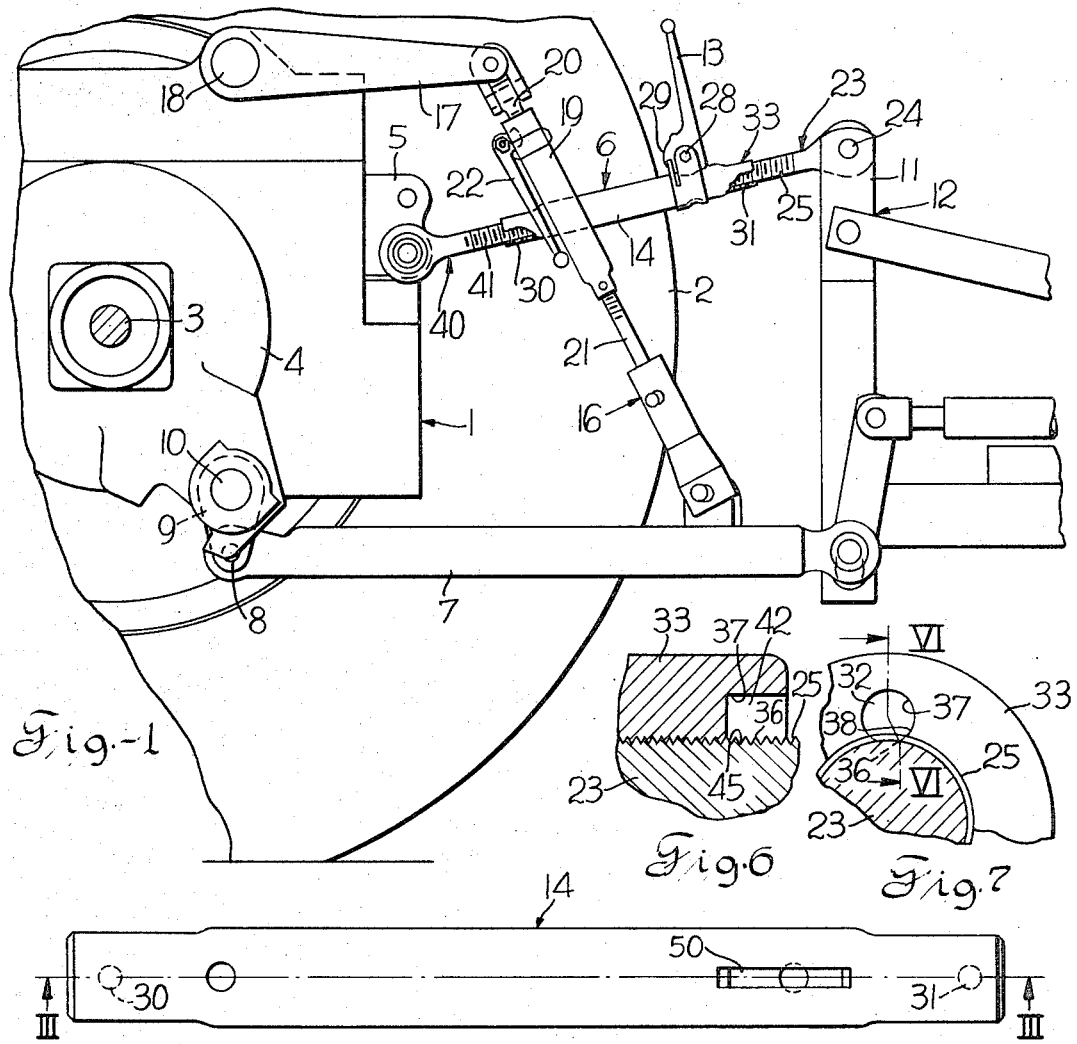
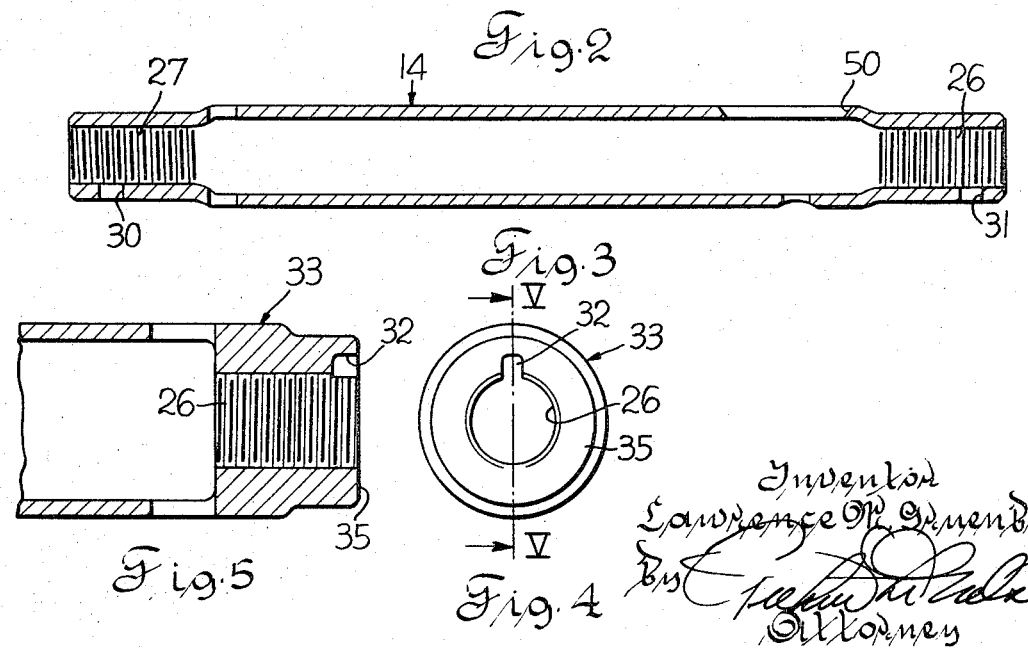
Inventor
Lawrence W. Quenberger
By
Attorney 3,731,951

ADJUSTABLE LINK THREAD CLEANER

This invention relates to an adjustable link adapted for use in the tractor three-point hitch having an intermediate sleeve threadedly connected to end extensions and more particularly to automatic thread cleaning means to provide a freely adjustable link.

The three-point hitch used on the conventional tractor for hitching to an implement includes draft arms for pulling the draft load and an upper link for beaming the implement. The lower draft arms transmit a signal in response to the draft load to a draft sensing mechanism connected to the forward end of the draft arms. The implement is raised or lowered through operation of a hydraulic system. The hydraulic system operates a rock shaft and rock arms connected through lift links to the lower draft arms. The length of the lift links and the length of the upper link are adjustable. The length of the lift links provides a winging adjustment. In other words, one or the other of the lift links can be lengthened or shortened to provide the proper leveling transversely relative to the two draft arms connected to the implement. A leveling longitudinally is controlled by the upper link which generally is a turnbuckle arrangement which can be lengthened or shortened as desired by the operator of the vehicle. Accordingly this adjustment is necessary to prevent the front end of the implement from nosing down or riding too high and giving improper operation. Proper adjustment of the links generally provides better operation with less strain on the implement.

The conventional lift links for winging adjustment and the upper link for beaming of the implement are generally constructed of a turnbuckle type adjustable link. The adjustable link has a tendency to load up on the exposed external periphery of the threads. This in turn creates a packing of the dirt in the thread root which is compressed as the extendable ends are screwed within the sleeve of the turnbuckle. Dirt also has a tendency to attract moisture which in turn causes rusting and further aggravates the situation. As the threads load up with dirt a considerable torque is required to rotate the turnbuckle in order to make the adjustment. Accordingly the tendency is to make no adjustment at all and to operate the implement improperly adjusted. This consequently lowers the quality of the work done by the implement.

An alternative to overcome this problem is then to load up the threaded portion of the extension members with a lubricant which does prevent rusting, however, it has a tendency to attract more dirt and thereby fails to overcome the problem. Accordingly this invention provides a thread cleaning device which cleans the thread as the adjustable link is operated. The thread cleaning mechanism provides an edge which conforms to the thread profile and shaves off the dirt and discharges it through an opening to thereby provide a free running thread for readily making the adjustment.

It is an object of this invention to provide a thread cleaning means on an adjustable link.

It is another object of this invention to provide a thread cleaning means through a scraping edge in the thread profile with clearance or an opening for discharge of the dirt removed from the thread.

It is a further object of this invention to provide on an adjustable link for a three-point hitch having adjustable means including a scraping edge confined to the thread profile which cleans the thread and removes the dirt and discharges the dirt through a recess to provide a freely running thread on the adjustable link.

The objects of this invention are provided by the construction of a recess in the threaded portion of the sleeve member of a turnbuckle type adjustable link. The internal member is thredly received in the external member and has a threaded portion extending beyond the sleeve. As the threaded portion extending beyond the sleeve is screwed into the sleeve, a scraping edge defined by the recessed portion in the external member complementary to the threaded portion of the extension member operates as a cleaning edge for removing dirt from the threads of the extension member. The recessed portion provides clearance to permit removal of dirt from the thread to be discharged through the recess and thereby permit a cleaning of the threads automatically with making adjustment of the adjustable link.

Referring to the drawings, the preferred embodiments of the invention are illustrated.

FIG. 1 illustrates a side view of a three-point hitch including the invention;

FIG. 2 illustrates a side view of an adjustable link;

FIG. 3 is a cross section view taken on line III—III of FIG. 2;

FIG. 4 is an end view of a modification on the invention;

FIG. 5 illustrates a cross section view taken on line V—V of FIG. 4;

FIG. 6 is a fragmentary section view taken on line VI—VI of FIG. 7 showing another modification; and FIG. 7 is an end view of the section view shown in FIG. 6.

Referring to the drawings, FIG. 1 illustrates a tractor 1, a wheel 2, for connection to a drive shaft such as 3 within the housing 4. The housing 4 carries the bracket 5 which supports the forward end of the upper link 6. A pair of lower draft arms 7 are universally connected on the forward end to pins 8 on the torsion bar arm 9 supported on the torsion bar 10. The lower draft arms 7 are connected to the mast 11 on the implement 12. The upper link 6 is also connected to the mast 11 on the implement 12.

The upper link 6 is an adjustable link with a lever 13 for applying a rotating torque to the sleeve 14. The lift link 16 is connected between a lower draft arm 7 and a lift arm 17 on a lift arm shaft 18. The lift link 16 includes an external sleeve 19 connected to an extension member 20 and 21. The external member 19 is provided with a lever 22 for applying rotating torque to the external sleeve member 19 to adjust the overall length of the lift link 16 which is similar to the adjustment provided on the upper link 6. Although the lift link 16 and the upper link 6 are both provided with an adjustment and thread cleaning means it is believed that it is only necessary to describe one of the adjustable links since their construction is generally the same.

The upper link 6 consists essentially of a turnbuckle in which the extension member 23 is universally connected to the mast 11 through spherical bushing embracing the pin 24. The extension member 23 includes a thread 25 on its external periphery. The sleeve 14 is shown in FIGS. 2 and 3 and includes an internal threaded portion 26 and 27 on its end.

The sleeve 14 also carries the lever 13 which is pivoted on a pin 28 and has an eccentric flange 29 which is received in opening 50 and complementary slot in a threaded portion 25 (not shown) which locks the sleeve 14 nonrotatably to the extension member 23.

The sleeve 14 is formed with openings 30 and 31 which extend through the threaded portions of the sleeve. The openings 30 and 31 form an edge on the threaded portion which rides in the thread profile of the threads 41 and 25 of the extension member 40 and 23 respectively. The effect of this edge is the same as that shown in FIGS. 4 and 5 and FIGS. 6 and 7 which show an enlarged view of the thread cleaner.

Referring to FIG. 4 a recess 32 is formed in the axial end of the sleeve 33. The recess 32 extends for a small angular dimension on the inner periphery of the threaded opening 26. The recess also extends axially from the end 35 of the sleeve 33. This operates as a thread cleaner for the external threads of the extension member 23.

Referring to FIG. 6 the sleeve 33 also shows a recess 42 in an enlarged view within the sleeve 33. The threaded portion 25 is shown in FIG. 6 and the edge 36 which conforms to the thread profile is also shown. The supporting structure 38 for the edge 36 is inclined to a cutting edge to undercut the dirt in the thread profile 36. The dirt is then raised from the thread profile and forced into the recess 42 where it is discharged.

The upper link 6 includes an extension member 23 and also includes an extension member 40 which is connected to bracket 5. The extension member 40 carries a threaded portion 41 which is threadedly received in the opposite end of the sleeve 14. A similar thread cleaning device is formed on this end of the upper link 14 thereby providing a clean free running thread on both ends of the adjustable upper link 6.

The operations of the device will be described in the following paragraphs.

Links 6 and 16 are adjustable links and each is provided with a thread cleaning device. For the purpose of illustration, link 6 will be described. Link 6 consists essentially of an extension member 23 and an extension member 40 each threadedly received in the sleeve 14. The upper link 6 is essentially a turnbuckle with a right hand thread on one end and a left hand thread on the opposite end. The lever 13 can be locked in a parallel relationship with the sleeve 6 when the adjustment is made. The eccentric portion 29 is received in the axial slot of the extension member 23 when the adjustment is made. To adjust the upper link 6, the lever 13 is moved radially from the link as shown in FIG. 1. The lever then rotates the sleeve 14 and the threaded portions 26 and 27 then cause the extension members 23 and 40 to extend or contract depending on the direction of rotation of the sleeve 13. As the sleeve is rotated relative to the extension members 23 and 40 the edge 36 which is complementary to the thread profile 45 lifts the dirt from the thread profile thereby cleaning the threads as they are screwed inwardly into the sleeve 14. The dirt is then permitted to fall free of the link through the recess 42 formed in the sleeve 14.

With the dirt discharged from the recess 42 the thread is maintained in a clean, freely running condition to permit readily adjusting of the upper link. As the extension member 23 extends in to the sleeve 14 the likelihood of dirt filling the threads is not too great so a thread cleaner on the external end in the thread of the sleeve is generally sufficient. It is also considered within the limits of this invention to reverse the location of the cleaning device by placing it on the internal thread as well as on the external thread. This, however, is not usually necessary since the greatest likelihood of dirt filling the thread is on the extension member which is exposed when the turnbuckle is extended. Accordingly the preferred embodiment of this invention is shown wherein the thread cleaner is formed on the sleeve member as shown and illustrated.

The embodiments of the invention in which an exclusive property or privilege is claimed are defined as follows:

1. A three-point hitch on a tractor having thread cleaning means comprising, a three-point hitch including, an adjustable link including an external member defining a threaded opening, an internal threaded extension member threadedly received in said external member, means defining a recess portion having an axial dimension formed in the threaded portion of said external member, an edge extending the axial dimension delineating the recess portion and complementing the thread profile of the internal member to thereby clean the threads of said internal member and permit removal of foreign material through said recess portion on said external member.

2. A three-point hitch on a tractor having thread cleaning means as set forth in claim 1 wherein said adjustable link includes a turnbuckle.

3. A three-point hitch on a tractor having thread cleaning means as set forth in claim 1 wherein said internal threaded extension member includes a screw thread on an eyebolt adapted for connection to an implement, a sleeve threadedly receiving said eyebolt to thereby provide adjustment of said link.

4. A three-point hitch on a tractor having thread cleaning means as set forth in claim 1 wherein said external member defining a recessed portion includes means defining a hole radially extending from the external portion to the internal portion of said external member.

5. A three-point hitch on a tractor having thread cleaning means as set forth in claim 1 wherein said recessed portion of said external member includes means defining a groove in the internal threaded portion of said external member.

6. A three-point hitch on a tractor having thread cleaning means as set forth in claim 1 wherein said recessed portion of said external member includes means defining an axial groove extending from the end of said external member threaded portion of said external member.

7. A three-point hitch on a tractor having thread cleaning means as set forth in claim 1 wherein said adjustable link includes an upper link of the three-point hitch.

8. A three-point hitch on a tractor having thread cleaning means as set forth in claim 1 wherein said adjustable link includes a lift link for winging adjustment of said three-point hitch.

9. A three-point hitch on a tractor having thread cleaning means as set forth in claim 1 wherein said recessed portion of said external member defines the edge extending for an axial dimension, said edge defines a substantially right angle facing relative to the surface engaging the thread profile on the external member for scraping dirt from the thread of said internal member.

10. A three-point hitch on a tractor having thread cleaning means as set forth in claim 1 wherein said edge extending an axial dimension in said external member defines a structure forming an acute angle and a cutting edge to facilitate cleaning dirt from the thread of said internal member.

* * * * *